(12) United States Patent
Lin et al.

(10) Patent No.: US 11,620,509 B2
(45) Date of Patent: Apr. 4, 2023

(54) MODEL CONSTRUCTING METHOD OF NEURAL NETWORK MODEL, MODEL CONSTRUCTING SYSTEM, AND NON-TRANSITORY COMPUTER READABLE STORAGE MEDIUM

(71) Applicant: HTC Corporation, Taoyuan (TW)

(72) Inventors: Cheng-Hsien Lin, Taoyuan (TW); Tung-Ting Yang, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 946 days.

(21) Appl. No.: 16/421,491

(22) Filed: May 24, 2019

(65) Prior Publication Data
US 2019/0362230 A1  Nov. 28, 2019

Related U.S. Application Data

(60) Provisional application No. 62/676,291, filed on May 25, 2018.

(51) Int. Cl.
| | |
|---|---|
| *G06V 10/764* | (2022.01) |
| *G06V 10/82* | (2022.01) |
| *G06V 10/94* | (2022.01) |
| *G06N 3/08* | (2023.01) |
| *G06F 18/21* | (2023.01) |

(52) U.S. Cl.
CPC ............... *G06N 3/08* (2013.01); *G06F 18/21* (2023.01); *G06V 10/764* (2022.01); *G06V 10/82* (2022.01); *G06V 10/94* (2022.01)

(58) Field of Classification Search
CPC ...... G06N 3/08; G06N 3/0454; G06N 3/0481; G06N 3/04; G06N 3/063; G06K 9/6217; G06K 9/6271; G06V 10/82; G06V 10/94
See application file for complete search history.

(56) References Cited

U.S. PATENT DOCUMENTS

| | | | |
|---|---|---|---|
| 11,341,616 B2* | 5/2022 | Wang | G16H 30/40 |
| 2017/0228639 A1* | 8/2017 | Hara | G06N 3/08 |
| 2017/0351948 A1* | 12/2017 | Lee | G06N 3/084 |
| 2018/0174034 A1* | 6/2018 | Obradovic | H01L 29/8083 |
| 2019/0095464 A1* | 3/2019 | Xie | G06F 16/583 |
| 2019/0114547 A1* | 4/2019 | Jaganathan | G06K 9/6267 |
| 2019/0138896 A1* | 5/2019 | Deng | G06N 3/0445 |
| 2019/0318469 A1* | 10/2019 | Wang | G01N 21/8851 |
| 2019/0325273 A1* | 10/2019 | Kumar | G06V 10/82 |
| 2019/0332940 A1* | 10/2019 | Han | G06N 3/082 |
| 2019/0348011 A1* | 11/2019 | Kurokawa | G09G 5/14 |
| 2020/0210893 A1* | 7/2020 | Harada | G06K 9/6267 |
| 2020/0311456 A1* | 10/2020 | Ji | G16H 30/40 |
| 2020/0380365 A1* | 12/2020 | Karino | G06N 3/0472 |

(Continued)

*Primary Examiner* — Ming Y Hon
(74) *Attorney, Agent, or Firm* — CKC & Partners Co., LLC

(57) ABSTRACT

A model constructing method for a neural network model applicable for image recognition processing is disclosed. The model constructing method includes the following operation: updating, by a processor, a plurality of connection variables between a plurality of layers of the neural network model, according to a plurality of inputs and a plurality of outputs of the neural network model. The plurality of outputs represent a plurality of image recognition results. The plurality of connection variables represent a plurality of connection intensities between each two of the plurality of layers.

17 Claims, 4 Drawing Sheets

(56) References Cited

U.S. PATENT DOCUMENTS

2020/0411199 A1* 12/2020 Shrager .................. G16H 15/00
2021/0110273 A1* 4/2021 Kwon .................. G06N 3/0454
2021/0224640 A1* 7/2021 Nakahara ............. G06N 3/0481

* cited by examiner

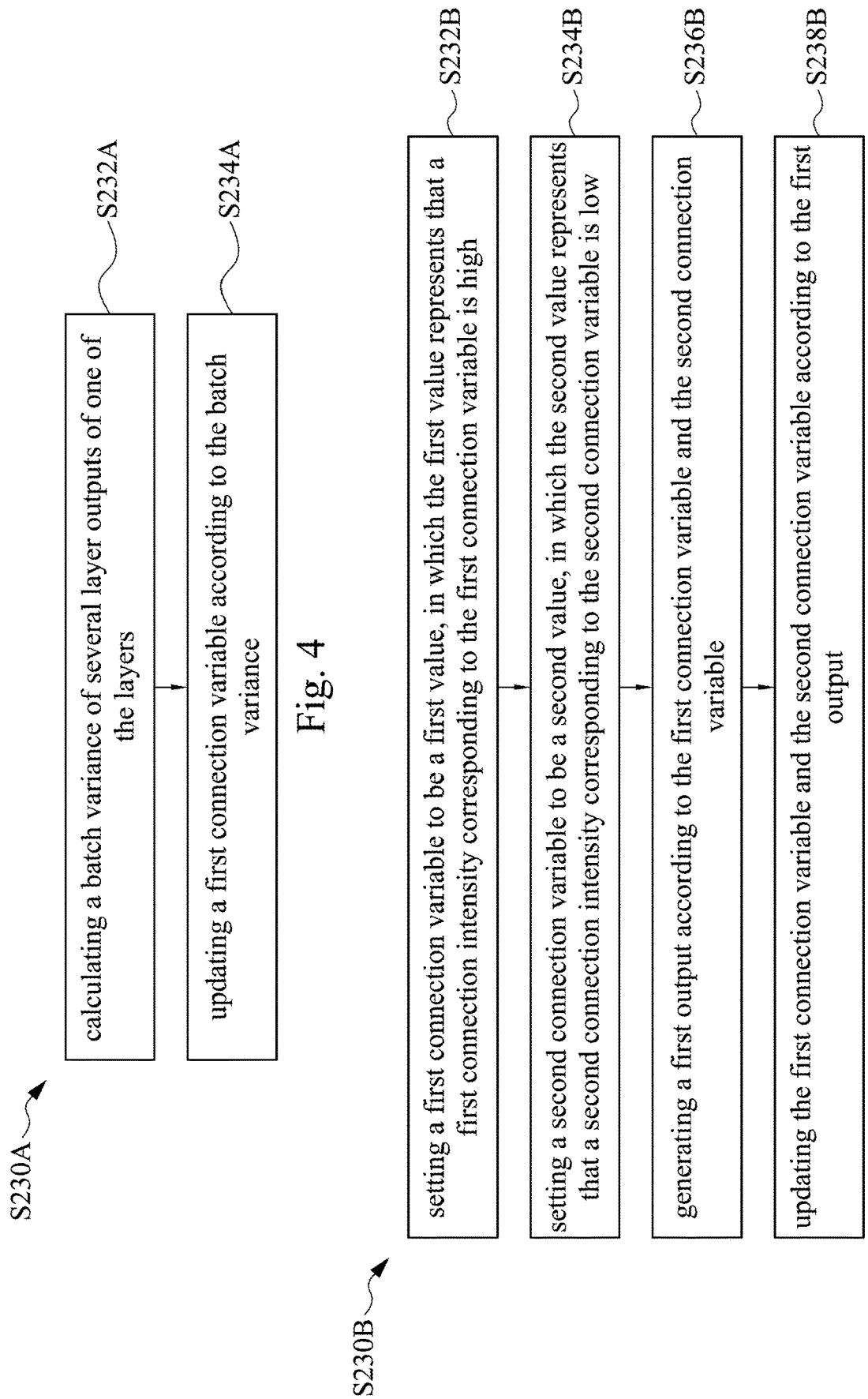

MODEL CONSTRUCTING METHOD OF NEURAL NETWORK MODEL, MODEL CONSTRUCTING SYSTEM, AND NON-TRANSITORY COMPUTER READABLE STORAGE MEDIUM

RELATED APPLICATIONS

This application claims priority to U.S. Provisional Application Ser. No. 62/676,291, filed May 25, 2018, which is herein incorporated by reference.

BACKGROUND

Technical Field

The present disclosure relates to a model constructing method of a neural network model, a model constructing system, and a non-transitory computer readable storage medium. More particularly, the present disclosure relates to a model constructing method of a neural network model, a model constructing system, and a non-transitory computer readable storage medium for optimizing the neural network construction dynamically.

Description of Related Art

In recent years, neural networks have been effectively applied to different technical fields. The existing methods for neural training need to pre-define the model architecture. The existing methods for neural training do not learn the connection between each layers, they just use pre-defined connection paths between the layers, without dynamically search for best model architecture.

SUMMARY

One aspect of the present disclosure is related to a model constructing method for a neural network model applicable for image recognition processing is disclosed. The model constructing method includes the following operation: updating, by a processor, a plurality of connection variables between a plurality of layers of the neural network model, according to a plurality of inputs and a plurality of outputs of the neural network model. The plurality of outputs represent a plurality of image recognition results. The plurality of connection variables represent a plurality of connection intensities between each two of the plurality of layers.

Another aspect of the present disclosure is related to a model constructing system for a neural network model applicable for image recognition processing. The model constructing system includes a memory and a processor. The memory is configured to store at least one instruction. The processor is coupled to the memory, in which the processor is configured to access and process the at least one instruction to: update a plurality of connection variables between a plurality of layers of the neural network model, according to a plurality of inputs and a plurality of outputs of the neural network model. The plurality of outputs represent a plurality of image recognition results. The plurality of connection variables represent a plurality of connection intensities between each two of the plurality of layers.

Another aspect of the present disclosure is related to a non-transitory computer readable storage medium storing one or more programs comprising instructions, which when executed, causes one or more processing components to perform operations including the following operations: updating a plurality of connection variables between a plurality of layers of a neural network model applicable for image recognition processing, according to a plurality of inputs and a plurality of outputs of the neural network model. The plurality of outputs represent a plurality of image recognition results. The plurality of connection variables represent a plurality of connection intensities between each two of the plurality of layers.

Through the operations of one embodiment described above, whether to keep or abandon the connection between the layers which are not adjacent to each other may be trained dynamically. The adjustment of the connection intensity between the layers which are not adjacent to each other may be trained dynamically. Better accuracy and performance of the neural network structure may be achieved dynamically.

BRIEF DESCRIPTION OF THE DRAWINGS

The invention can be more fully understood by reading the following detailed description of the embodiments, with reference made to the accompanying drawings as follows:

FIG. 4 is a flowchart of an operating method of an operation in FIG. 2 in accordance with some embodiments of the present disclosure.

FIG. 5 is a flowchart of another operating method of an operation in FIG. 2 in accordance with some embodiments of the present disclosure.

DETAILED DESCRIPTION

Figure 1:
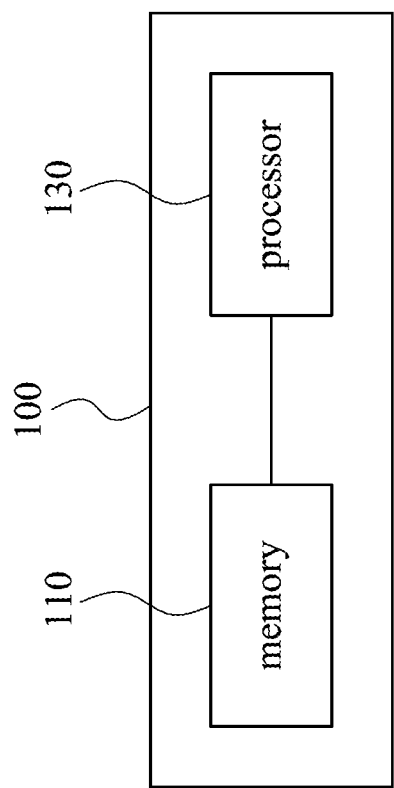
FIG. 1 is a schematic block diagram of a model constructing system in accordance with some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic block diagram of a model constructing system 100 in accordance with some embodiments of the present disclosure. As illustrated in FIG. 1, the model constructing system 100 includes a memory 110 and a processor 130. The processor 130 is coupled to the memory 110.

In some embodiments, the memory 110 can be a flash memory, a HDD, a SSD (Solid State Disk), a DRAM (Dynamic Random Access Memory) or a SRAM (Static Random-Access Memory). In some embodiments, the memory 110 can be a non-transitory computer readable medium stored with at least one instruction associated with a machine learning method. The at least one instruction can be accessed and executed by the processor 130.

In some embodiments, the processor 130 can be, but is not limited to being, a single processor or an integration of multiple microprocessors such as CPUs or GPUs. The microprocessors are electrically coupled to the memory 110 in order to access the at least one instruction. According to the at least one instruction, the above-mentioned machine learning method can be performed. For better understanding, details of the machine learning method will be described in the following paragraphs.

Figure 2:
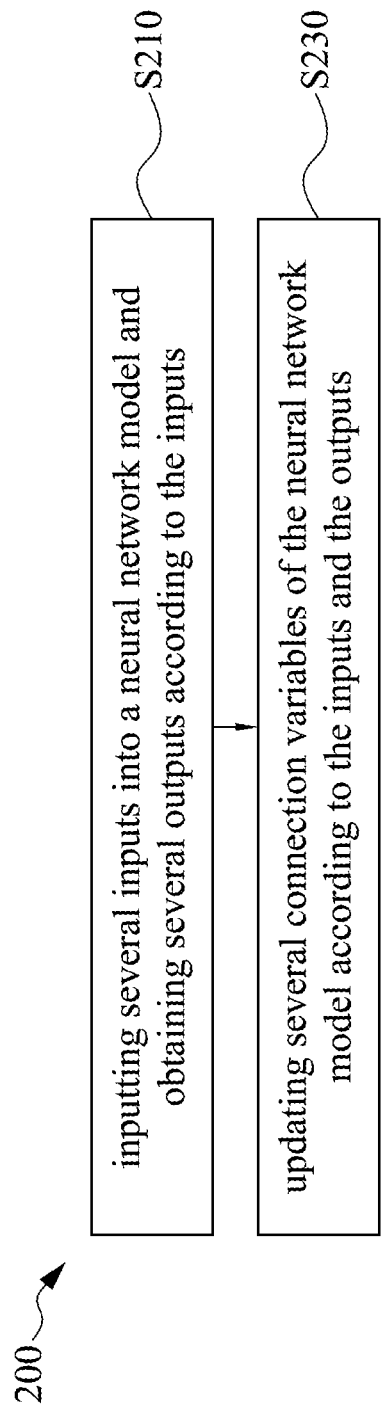
FIG. 2 is a flowchart of a model constructing method in accordance with some embodiments of the present disclosure.

Details of the present disclosure are described in the paragraphs below with reference to an model constructing method in FIG. 2, in which FIG. 2 is a flowchart of a model constructing method 200 suitable to be applied on the model constructing system 100 in FIG. 1, in accordance with one embodiment of the present disclosure. However, the present disclosure is not limited to the embodiment below.

Reference is made to FIG. 2. FIG. 2 is a flowchart of a model constructing method 200 in accordance with some embodiments of the present disclosure. However, the present disclosure is not limited to the embodiment below.

It should be noted that the model constructing method can be applied to the model constructing system 100 shown in FIG. 1. To simplify the description below, the embodiments shown in FIG. 1 will be used as an example to describe the method according to an embodiment of the present disclosure. However, the present disclosure is not limited to application to the embodiments shown in FIG. 1.

It should be noted that, in some embodiments, the method may be implemented as a computer program. When the computer program is executed by a computer, an electronic device, or the one or more processor 130 in FIG. 1, this executing device perform the method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Reference is made to FIG. 2. The model constructing method 200 includes the operations below.

In operation S210, inputting several inputs into a neural network model and obtaining several outputs according to the inputs. In some embodiments, the operation S210 may be operated by the processor 130 in FIG. 1.

Figure 3:
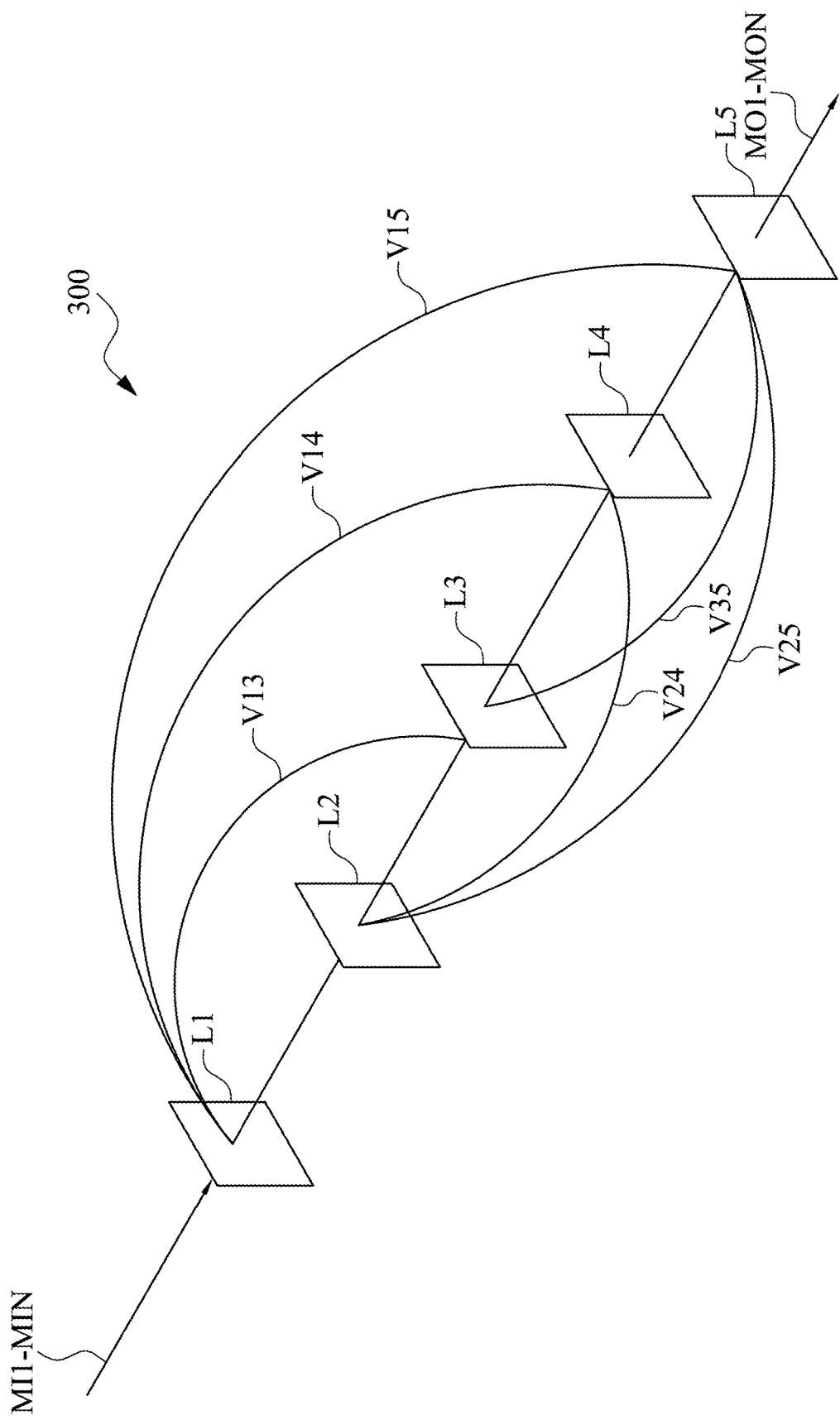
FIG. 3 is a schematic diagram of a neural network model in accordance with some embodiments of the present disclosure.

Reference is made to FIG. 3 at the same time. FIG. 3 is a schematic diagram of a neural network model 300 in accordance with some embodiments of the present disclosure. As illustrated in FIG. 3, the neural network model 300 includes several layers L1 to L5. Several connection variables V13 to V35 exist between the layers L1 to L5. To be detailed, one of the connection variables V13 to V35 exists between two of the layers L1 to L5. Each of the connection variables V13 to V35 represents connection intensities between each two of the layers L1 to L5.

For example, the connection variable V13 exist between layer L1 and L3, and the connection variable V13 represent the connection intensity between layer L1 and L3, and so on.

In operation S230, updating several connection variables of the neural network model according to the inputs and the outputs. In some embodiments, the operation S230 may be operated by the processor 130 in FIG. 1. According to the inputs MI1 to MIN and the outputs MO1 to MON of the neural network model 300, the processor 130 updates the connection variables V13 to V35.

Various methods may be implemented for operation S230. Reference is made to FIG. 4. FIG. 4 is a flowchart S230A of an operating method of operation S230 of FIG. 2 in accordance with some embodiments of the present disclosure. Operation S230A includes the operations below.

In operation S232A, calculating a batch variance of several layer outputs of one of the layers. In some embodiments, the operation S232A may be operated by the processor 130 in FIG. 1. Reference is made to FIG. 3 at the same time. For example, assume that when different layer inputs LI1 to LI3 are input to the layer L1, the corresponding layer outputs of the layer L1 are layer outputs LO1 to LO3. The processor 130 calculates a batch variance of the layer outputs LO1 to LO3.

In operation S234A, updating a first connection variable of the connection variables according to the batch variance, in which the first connection variable represent a connection intensity between the one of the layers and another one of the layers. In some embodiments, the operation S234A may be operated by the processor 130 in FIG. 1.

An example for operation S234A is as following. Reference is made to FIG. 3 at the same time. For example, assume that the batch variance of the layer outputs LO1 to LO3 of the layer L1 is the batch variance σ. According to the batch variance σ, the processor 130 updates the connection variables between the layer L1 and the other layers L2 to L5. That is, the processor 130 updates the connection variable V13 between the layer L1 and the layer L3 according to the batch variance σ, the processor 130 updates the connection variable V14 between the layer L1 and the layer L4 according to the batch variance σ, and the processor 130 updates the connection variable V15 between the layer L1 and the layer L5 according to the batch variance σ.

Reference is made to FIG. 5. FIG. 5 is a flowchart S230B of an operating method of operation S230 of FIG. 2 in accordance with some embodiments of the present disclosure. Operation S230B includes the operations below.

In operation S232B, setting a first connection variable to be a first value, in which the first value represents that a first connection intensity corresponding to the first connection variable is high. In some embodiments, the operation S232B may be operated by the processor 130 in FIG. 1.

In operation S234B, setting a second connection variable to be a second value, in which the second value represents that a second connection intensity corresponding to the second connection variable is low. In some embodiments, the operation S234B may be operated by the processor 130 in FIG. 1.

In operation S236B, generating a first output according to the first connection variable and the second connection variable. In some embodiments, the operation S236B may be operated by the processor 130 in FIG. 1.

In operation S238B, updating the first connection variable and the second connection variable according to the first output. In some embodiments, the operation S238B may be operated by the processor 130 in FIG. 1.

Examples for operations S232B to S238B are as following. Reference is made to FIG. 3 at the same time. Assume that the first value which represents that the connection intensity between two of the layers is high is the value of 1, and the second value which represents that the connection intensity between two of the layers is low is the value of 0. For example, in one embodiment, the processor 130 sets the connection variable V14 between the layer L1 and the layer L4 to be the value of 1, and the processor 130 sets the connection variable V24 between the layer L2 and the layer L4 to be the value of 0.

In accordance with the above, after setting at least one of the connection variables V13 to V35, the processor 130 inputs an input MI1 into the neural network model 300 and generates an output MO1 through the neural network model 300 corresponding to the input MI1 with the connection variable V14 being 1 and the connection variable V24 being 0. According to the output MO1, the processor 130 updates the connection variables V14 and V24 according to the backward gradient. For example, in some embodiments, the connection variable V14 may be updated to be 0.5, and the connection variable V24 may be updated to be 1.

With the updated connection variables V14 and V24, the processor 130 further inputs an input MI2 into the neural network model 300 and generates an output MO2 through the neural network model 300 corresponding to the input MI2 with the connection variable V14 being 0.5 and the connection variable V24 being 1. According to the output MO2, the processor 130 updates the connection variables V14 and V24 again.

In some embodiments, according to the output MO1, the processor 130 generates a backward gradient, in which the backward gradient present the gradient that the connection variables should be tuned.

It should be noted that, in some embodiments, in operations S232B and S234B, the at least one of the connection variables V13 to V35 to be set to be the first value, for example, to be set to be 1, is selected randomly by the processor 130. Similarly, the at least one of the connection variables V13 to V35 to be set to be the second value, for example, to be set to be 0, is selected randomly by the processor 130.

In some embodiments, the value of the connection variables V13 to V35 are between any of the two values. For example, the connection variables V13 to V35 may be between 1 and 0, with 1 representing the highest connection intensity and 0 representing the lowest connection intensity. For another example, the connection variables V13 to V35 may be between −1 and 1, or any other values.

In some embodiments, the connection variables V13 to V35 may include only two status, for example, connected or non-connected. For example, the connection variables V13 to V35 may include values of 1 and 0 only, in which value 1 represents that the corresponding layers are connected, and value 0 represents that the corresponding layers are not connected. If the connection variable V13 is 1, the corresponding layers L1 and L3 are connected. If the connection variable V13 is 0, the corresponding layers L1 and L3 are not connected.

In some embodiments, the two of the layers L1 to L5 that are adjacent to each other are connected originally. The embodiments of the present disclosure trained the connection variables between the two of the layers L1 to L5, in which the two of the layers L1 to L5 are not adjacent to each other.

In some embodiments, before the training of the neural network model 300 is started, the processor 130 is configured to connect all of the layers L1 to L5 between each other. That is, each two of the layers L1 to L5 are connected to each other initially by the processor 130. Moreover, for each of the connection relationships, the processor 130 presets a connection variable. For example, for the neural network model 300, the processor 130 connects all two of the layers L1 to L5 and presets the connection variables V13 to V35. In some embodiments, the connection variables V13 to V35 are preset randomly.

Figure 6:
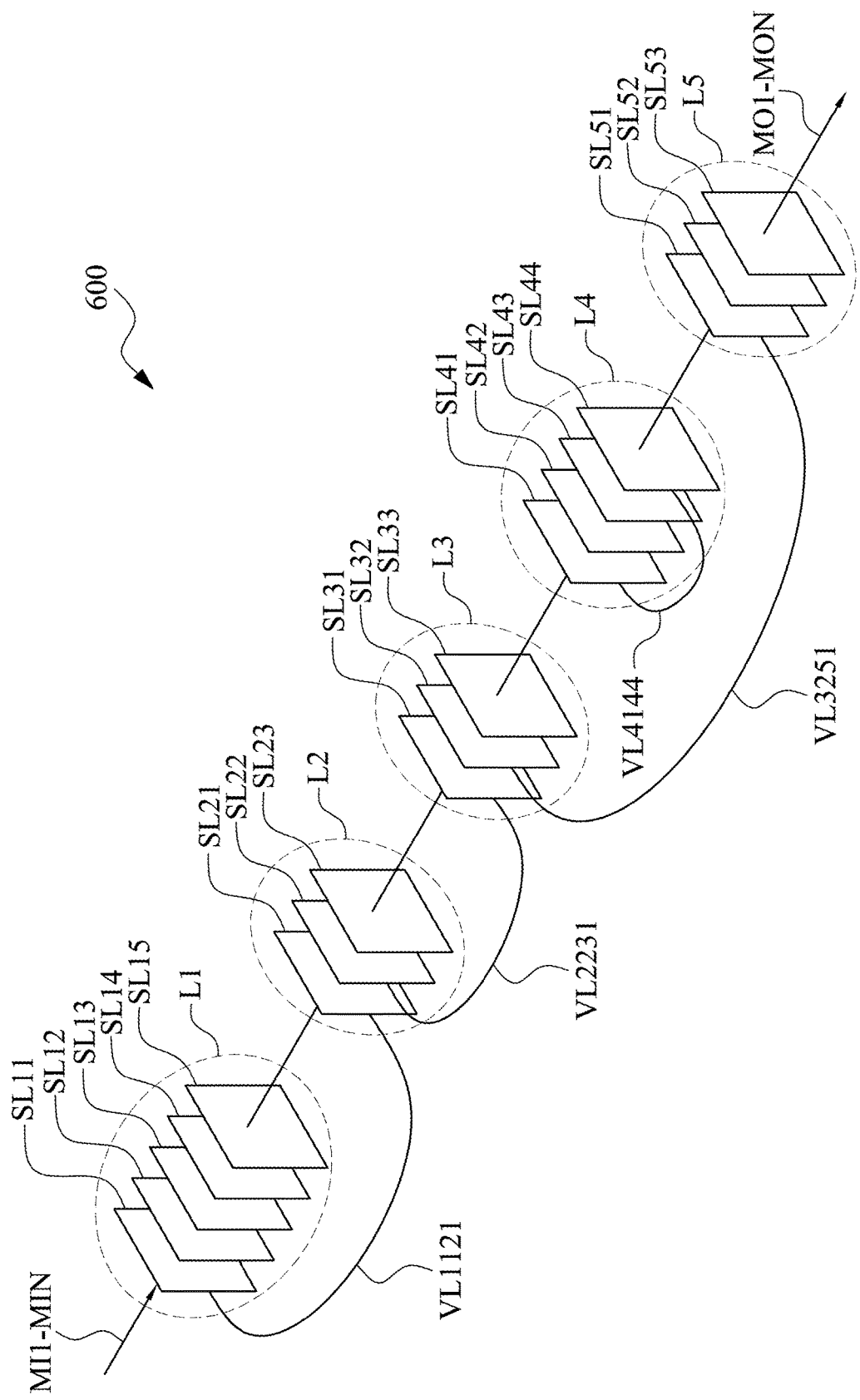
FIG. 6 is a schematic diagram of a neural network model in accordance with some embodiments of the present disclosure.

Reference is made to FIG. 6. FIG. 6 is a schematic diagram of a neural network model 600 in accordance with some embodiments of the present disclosure. As illustrated in FIG. 6, the neural network model 600 includes layers L1 to L5, and each of the layers L1 to L5 includes at least one sub-layer. For example, the layer L1 includes sub-layers SL11 to SL15, the layer L2 includes sub-layers SL21 to SL23, and so on.

As illustrated in FIG. 6, sub-layer SL11 and sub-layer SL21 are connected, and a sub-connection variable VL1121 exists between the sub-layer SL11 and the sub-layer SL21. Sub-layer SL22 and sub-layer SL31 are connected, and a sub-connection variable VL2231 exists between the sub-layer SL22 and the sub-layer SL31, and so on. The sub-connection variables and connection relationships between the sub-layers mentioning above and in FIG. 6 are for illustrative purposes only, and the present disclosure is not limited thereto. Any two of the sub-layers in FIG. 6 may be connected with a sub-connection variable. The sub-connection variables represent the connection intensities between each two of the sub-layers.

In some embodiments, the processor 130 as illustrated in FIG. 1 updates the sub-connection variables between the sub-layers SL11 to SL53 according to the inputs MI1 to MIN input to the neural network model 600 and the corresponding outputs MOI to MON output from the neural network model 600.

Details of updating the sub-connection variables of the neural network model 600 is similar to the methods of updating the connection variables of the neural network model 300, and may not be described again herein.

It should be noted that not only the sub-layers at different layers may be connected to each other, but also the sub-layers at the same layer may be connected to each other as well, as illustrated in FIG. 6.

In some embodiments, the way to activate and update the connection variables between the layers which are not adjacent to each other is not limited to the operations as mentioned in FIG. 4 and FIG. 5. The connection variables may be updated randomly, constantly, or using a pre-defined formula.

In some embodiments, the sizes of the layers of the neural network model are different, methods such as pooling, convolution, or deconvolution may be introduced to make the feature size matched, and the embodiments of updating the connection variables between the layers dynamically may also be applied.

It should be noted that the neural network model 300 in FIG. 3 and the neural network model 600 in FIG. 6 are applicable for image recognition processing. In some embodiments, the inputs MI1 to MIN as illustrated in FIG. 3 and FIG. 6 are images to be recognized, and the outputs MO1 to MON as illustrated in FIG. 3 and FIG. 6. are image recognition results. Through the operations of the embodiments described above, the neural network model 300 or 600 updates the connection between the layers of the neural network model 300 or 600 automatically by the processor, such that the image recognition results may be refined to be more exact or more correct.

Through the operations of the embodiments described above, whether to keep or abandon the connection between the layers which are not adjacent to each other may be trained dynamically. The adjustment of the connection intensity between the layers which are not adjacent to each other may be trained dynamically. Better accuracy and performance of the neural network structure may be achieved dynamically.

Although the present invention has been described in considerable detail with reference to certain embodiments thereof, other embodiments are possible. Therefore, the scope of the appended claims should not be limited to the description of the embodiments contained herein.

What is claimed is:

1. A model constructing method for a neural network model applicable for image recognition processing comprising:
   updating, by a processor, a plurality of connection variables between a plurality of layers of the neural network model, according to a plurality of inputs and a plurality of outputs of the neural network model, comprising:
      updating a first connection variable of the plurality of connection variables between a first layer and a second layer of the plurality of layers according to a batch variance of a plurality of layer outputs of the first layer;
   wherein the plurality of outputs represent a plurality of image recognition results,
   wherein the plurality of connection variables represent a plurality of connection intensities between each two of the plurality of layers, wherein the two of the plurality of layers are not adjacent to each other;
   wherein the first connection variable represents a first connection intensity between the first layer and the second layer.

2. The model constructing method as claimed in claim 1, wherein the plurality of layers comprise a plurality of sub-layers, wherein the model constructing method further comprises:
   updating a plurality of sub-connection variables between the plurality of sub-layers, according to the plurality of inputs and the plurality of outputs of the neural network model,
   wherein the plurality of sub-connection variable represent a plurality of sub-connection intensities between each two of the plurality of sub-layers.

3. The model constructing method as claimed in claim 1, further comprising:
   presetting the plurality of connection variables randomly.

4. The model constructing method as claimed in claim 1, further comprising:
   calculating the batch variance.

5. The model constructing method as claimed in claim 1, further comprising:
   setting a second connection variable of the plurality of connection variables to be a first value, wherein the first value represents that a second connection intensity corresponding to the second connection variable is high;
   setting a third connection variable of the plurality of connection variables to be a second value, wherein the second value represents that a third connection intensity corresponding to the third connection variable is low;
   generating a first output of the plurality of outputs according to the second connection variable and the third connection variable; and
   updating the second connection variable and the third connection variable according to the first output.

6. The model constructing method as claimed in claim 5, wherein the second connection variable and the third connection variable are selected randomly.

7. A model constructing system for a neural network model applicable for image recognition processing comprising:
   a memory configured to store at least one instruction; and
   a processor coupled to the memory, wherein the processor is configured to access and process the at least one instruction to:
      update a plurality of connection variables between a plurality of layers of the neural network model, according to a plurality of inputs and a plurality of outputs of the neural network model, comprising:
         updating a first connection variable of the plurality of connection variables between a first layer and a second layer of the plurality of layers according to a batch variance of a plurality of layer outputs of the first layer;
      wherein the plurality of outputs represent a plurality of image recognition results,
      wherein the plurality of connection variables represent a plurality of connection intensities between each two of the plurality of layers, wherein the two of the plurality of layers are not adjacent to each other;
      wherein the first connection variable represents a first connection intensity between the first layer and the second layer.

8. The model constructing system as claimed in claim 7, wherein the plurality of layers comprise a plurality of sub-layers, wherein the processor is further configured to access and process the at least one instruction to:
  update a plurality of sub-connection variables between the plurality of sub-layers, according to the plurality of inputs and the plurality of outputs of the neural network model,
  wherein the plurality of sub-connection variable represent a plurality of sub-connection intensities between each two of the plurality of sub-layers.

9. The model constructing system as claimed in claim 7, wherein the processor is further configured to preset the plurality of connection variables randomly.

10. The model constructing system as claimed in claim 7, wherein the processor is further configured to access and process the at least one instruction to:
  calculate the batch variance.

11. The model constructing system as claimed in claim 7, wherein the processor is further configured to access and process the at least one instruction to:
  set a second connection variable of the plurality of connection variables to be a first value, wherein the first value represents a second connection intensity corresponding to the second connection variable is high;
  set a third connection variable of the plurality of connection variables to be a second value, wherein the second value represents a third connection intensity corresponding to the third connection variable is low;
  generate a first output of the plurality of outputs according to the second connection variable and the third connection variable; and
  update the second connection variable and the third connection variable according to the first output.

12. The model constructing system as claimed in claim 11, wherein the second connection variable and the third connection variable are selected randomly.

13. A non-transitory computer readable storage medium storing one or more programs comprising instructions, which when executed, causes one or more processing components to perform operations comprising:
  updating a plurality of connection variables between a plurality of layers of a neural network model applicable for image recognition processing, according to a plurality of inputs and a plurality of outputs of the neural network model, comprising:
    updating a first connection variable of the plurality of connection variables between a first layer and a second layer of the plurality of layers according to a batch variance of a plurality of layer outputs of the first layer;
  wherein the plurality of outputs represent a plurality of image recognition results,
  wherein the plurality of connection variables represent a plurality of connection intensities between each two of the plurality of layers, wherein the two of the plurality of layers are not adjacent to each other;
  wherein the first connection variable represents a first connection intensity between the first layer and the second layer.

14. The non-transitory computer readable storage medium as claimed in claim 13, wherein the plurality of layers comprises a plurality of sub-layers, wherein the operations further comprise:
  updating a plurality of sub-connection variables between the plurality of sub-layers, according to the plurality of inputs and the plurality of outputs of the neural network model,
  wherein the plurality of sub-connection variable represent a plurality of sub-connection intensities between each two of the plurality of sub-layers.

15. The non-transitory computer readable storage medium as claimed in claim 13, wherein the operations further comprise:
  presetting the plurality of connection variables randomly.

16. The non-transitory computer readable storage medium as claimed in claim 15, wherein the operations further comprise:
  calculating the batch variance.

17. The non-transitory computer readable storage medium as claimed in claim 13, wherein the operations further comprise:
  setting a second connection variable of the plurality of connection variables to be a first value, wherein the first value represents a second connection intensity corresponding to the second connection variable is high;
  setting a third connection variable of the plurality of connection variables to be a second value, wherein the second value represents a third connection intensity corresponding to the third connection variable is low;
  generating a first output of the plurality of outputs according to the second connection variable and the third connection variable; and
  updating the second connection variable and the third connection variable according to the first output,
  wherein the second connection variable and the third connection variable are selected randomly.

* * * * *